Patented Aug. 27, 1929.

1,726,309

UNITED STATES PATENT OFFICE.

ELMER H. PAYNE AND SAMUEL A. MONTGOMERY, OF WOODRIVER, ILLINOIS, ASSIGNORS TO STANDARD OIL COMPANY, OF WHITING, INDIANA, A CORPORATION OF INDIANA.

TREATMENT OF EMULSION OILS.

No Drawing.      Application filed March 1, 1922. Serial No. 540,371.

The present invention relates to the treatment of emulsion oils and will be fully understood from the following description.

The emulsion oils treated in accordance with the present invention may suitably be any type of oil-water emulsions occurring in nature or in refinery practice, regardless of whether oil or water be the continuous phase, although it is especially directed to those emulsions in which oil is the continuous phase. Emulsion oils that have been treated in accordance with the present invention have been, for example, bottom settlings from crude oils such as Mid-Continent crude, separator's slop, gas-oil bottom settlings, paraffin distillate bottom settlings and emulsion crude oils, such as those occurring in California. We have discovered that it is possible to break down all such emulsions by means of the spent alkali solutions employed in the washing of hydrocarbon oils and gases. For example, the spent caustic soda solution used in washing gasoline, kerosene or other distillates, or the spent "doctor" employed in the treatment of similar oils may be used in connection with the present invention. Such spent solutions may have a sodium hydroxide alkalinity of from 2% to 15%, the fresh solutions from which they are derived having a sodium hydroxide alkalinity of 18 to 20%, that is, the caustic soda alkalinity of the fresh solutions has been reduced by at least one-fifth. The spent solutions preferably employed are those in which the sodium hydroxide alkalinity has been reduced to not more than one-third of the original caustic soda alkalinity of the solution. Examples of such spent solutions found available for use has shown sodium hydroxide alkalinities of 15%, 6.43%, 5.18% and 2.08%.

The emulsion oil to be broken down is admixed with from 0.25% to 15% by volume of the spent caustic soda solution and the mixture is preferably heated to 150 to 210° F., say about 180° F., and the agitation is continued until thorough mixture is effected. The emulsion is then allowed to settle while being maintained at such a temperature and stratification takes place with a clean-cut separation of oil and water and occasionally of an intermediate layer containing asphaltic matter, dirt and the like.

The following examples illustrate the practice of the present invention:

1121 barrels of bottom settlings from Mid-Continent crude oil containing about 50% of oil were admixed with 60 barrels of spent caustic, the mixture being heated to 180° F. and agitated, for example, by blowing, to effect thorough admixture. The mixture is then allowed to settle, preferably while maintaining the temperature or a temperature above 150° F. and was found to stratify perfectly into an upper layer of oil substantially free from water and dirt, a lower layer of water, substantially free from oil, and a very small, intermediate, clearly defined layer containing dirt, asphaltic matter and the like. The recovery of pure oil was 48.88%.

As a further example, 720 barrels of bottom settlings from paraffin distillate were treated with 90 barrels of spent caustic from a gasoline absorber system. The manner of treatment was substantially the same as above described. 559 barrels or 77.6% of oil substantially free from water were recovered.

By the term "spent caustic soda" as used in the following claims, spent "doctor" as well as spent caustic soda solution is intended to be designated. Spent "doctor" has been found to act in all respects substantially in the same manner as spent caustic soda solutions. Caustic soda solutions and doctor are regarded as "spent" within the meaning of this invention when they have been utilized for the washing of hydrocarbon oils or gases to such an extent that their caustic soda alkalinity has been reduced by at least one-fifth.

We claim:

1. The method of treating emulsion oils to effect separation of their constituents which consists in admixing therewith a spent caustic soda solution previously utilized in oil refinery operations for washing hydrocarbon oils or refinery gases and maintaining the mixture at an elevated temperature until stratification takes place.

2. The method of treating emulsion oils to effect separation of their constituents which consists in admixing therewith a spent caustic soda solution previously utilized in oil refinery operations for washing hydrocarbon oils or refinery gases derived from an 18 to 20% caustic soda solution and having a caustic soda alkalinity of 2 to 6%, and maintaining the mixture at an elevated temperature until stratification takes place.

3. The method of treating emulsion oils to effect separation of their constituents which consists in admixing therewith 0.25 to 15% of a spent caustic soda solution previously utilized in oil refinery operations for washing hydrocarbon oils or refinery gases, maintaining the mixture at above 150° F. and permitting stratification thereof.

ELMER H. PAYNE.
SAMUEL A. MONTGOMERY.